(12) United States Patent
Ammond et al.

(10) Patent No.: US 11,738,418 B2
(45) Date of Patent: Aug. 29, 2023

(54) FASTENER DELIVERY ARRANGEMENT AND RELATED METHOD

(71) Applicant: Air Way Automation, Inc., Grayling, MI (US)

(72) Inventors: John E. Ammond, Williamsburg, MI (US); Douglas E. Wilson, East Jordan, MI (US); Anthony John Grech, Roscommon, MI (US)

(73) Assignee: Air Way Automation, Inc., Grayling, MI (US)

( * ) Notice: Subject to any disclaimer, the term of this patent is extended or adjusted under 35 U.S.C. 154(b) by 0 days.

(21) Appl. No.: 17/643,583

(22) Filed: Dec. 9, 2021

(65) Prior Publication Data

US 2022/0184756 A1 Jun. 16, 2022

Related U.S. Application Data

(60) Provisional application No. 63/123,783, filed on Dec. 10, 2020.

(51) Int. Cl.
*B23P 19/00* (2006.01)
*B65B 35/20* (2006.01)
*B65B 35/40* (2006.01)

(52) U.S. Cl.
CPC ............ *B23P 19/004* (2013.01); *B65B 35/20* (2013.01); *B65B 35/40* (2013.01)

(58) Field of Classification Search
CPC . B65B 35/20; B65B 35/40; B66F 9/02; B66F 9/04; B65G 3/04; B65G 25/04; B65G 47/12; B65G 47/16; B65G 47/18; B65G 47/19; B65G 47/20; B65G 47/90; B65G 47/901; B23P 19/001; B23P 19/003; B23P 19/004
USPC .............. 221/1, 163, 164, 174, 270; 470/16; 29/771
See application file for complete search history.

(56) References Cited

U.S. PATENT DOCUMENTS

| | | | | |
|---|---|---|---|---|
| 4,330,232 | A * | 5/1982 | McClaren | B65G 3/04 414/268 |
| 4,732,296 | A * | 3/1988 | Heck | B23P 19/004 221/172 |
| 5,279,045 | A * | 1/1994 | Odashima | H01L 24/11 34/558 |
| 6,290,095 | B1 * | 9/2001 | Saito | H05K 13/028 221/163 |

(Continued)

*Primary Examiner* — Ryan J. Walters
(74) *Attorney, Agent, or Firm* — Price Heneveld LLP

(57) ABSTRACT

A fastener delivery arrangement includes a cylindrical sleeve member having first and second ends and an elongated relief extending between outer and inner walls and at least partially between the first and second ends of the sleeve member and in communication with the second end of the sleeve member and configured to receive a plurality of fasteners therethrough, a ram member having a circular cross-section and slidably movable within an interior space between a first position where the ram member is removed from covering the relief and a second position where the ram member covers the relief, a feed assembly configured to provide fasteners to the interior space, a cylinder assembly configured to actuate the ram member between the first and second positions, and a fastener receiver configured to receive the fasteners forced from the interior space of the sleeve member.

27 Claims, 5 Drawing Sheets

(56) References Cited

U.S. PATENT DOCUMENTS

| | | | | |
|---|---|---|---|---|
| 2003/0080139 A1* | 5/2003 | Davies | ............... | B23P 19/004 |
| | | | | 221/156 |
| 2004/0103517 A1* | 6/2004 | Chiba | ............... | B23P 19/001 |
| | | | | 29/559 |
| 2014/0332550 A1* | 11/2014 | Sirkett | ............... | B65G 47/19 |
| | | | | 221/1 |
| 2018/0299474 A1* | 10/2018 | Nakamura | ............ | G01N 35/04 |

* cited by examiner

FASTENER DELIVERY ARRANGEMENT AND RELATED METHOD

CROSS-REFERENCE TO RELATED APPLICATIONS

This application claims the benefit of U.S. Provisional Patent Application No. 63/123,783, filed on Dec. 10, 2020, entitled "FASTENER DELIVERY ARRANGEMENT AND RELATED METHOD," the entire disclosure of which is incorporated herein by reference.

BACKGROUND OF THE INVENTION

The embodiments as disclosed herein relate to a fastener delivery arrangement and a method related thereto, and in particular a fastener delivery arrangement that includes a cylindrical sleeve member and ram member arrangement configured to deliver fasteners, and in particular washers, between locations within a manufacturing cell, and even more particularly to delivering fasteners between a bulk supply location and an installation location within the manufacturing cell.

SUMMARY OF THE INVENTION

One embodiment comprises a fastener delivery arrangement that includes a cylindrical sleeve member having a first end and an at least partially open second end, an inner wall and an outer wall extending between the first and second ends, and an elongated relief having a first end and a second end and extending between the outer wall and the inner wall, the relief extending at least partially between the first and second ends of the sleeve member and in communication with the second end of the sleeve member and configured to receive a plurality of fasteners therethrough, the inner wall defining an interior space, and a ram member having a first end with a circular cross-section and a second end, wherein the ram member is slidably movable within the interior space between a first position where the first end of the ram member is proximate the first end of the relief and the ram member is removed from covering the relief, and a second position where the first end of the ram member is proximate the second end of the relief thereby forcing the plurality of fasteners from the interior space through the second end of the sleeve member and the ram member covers at least a majority of the relief. The fastener delivery arrangement may also include a feed assembly in operable communication with the relief of the sleeve member and configured to provide the plurality of fasteners to the interior space in a non-oriented manner, a cylinder assembly operably coupled to the second end of the ram member and configured to actuate the ram member between the first and second positions, and a fastener receiver configured to receive the plurality of fasteners forced from the interior space of the sleeve member as the ram member moves from the first position to the second position.

Another embodiment may also or alternatively comprise a fastener delivery arrangement that includes a cylindrical sleeve member having a first end and an at least partially open second end, an inner wall and an outer wall extending between the first and second ends, and an elongated relief having a first end and a second end and extending between the outer wall and the inner wall, the relief extending at least partially between the first and second ends of the sleeve member and in communication with the second end of the sleeve member and configured to receive a plurality of fasteners therethrough, the inner wall defining an interior space, the inner wall having an inner diameter, and a ram member having a first end with a circular cross-section and a second end, wherein the ram member is slidably movable within the interior space between a first position where the first end of the ram member is proximate the first end of the relief and the ram member is removed from covering the relief, and a second position where the first end of the ram member is proximate the second end of the relief thereby forcing the plurality of fasteners from the interior space through the second end of the sleeve member and the ram member covers at least a majority of the relief, the first end ram member having an outer diameter. The fastener delivery system may also include a drive assembly operably coupled to the second end of the ram member and configured to actuate the ram member between the first and second positions, wherein a difference between the inner diameter of the inner wall of the sleeve member and the outer diameter of the first end of the ram member is between about 0.002 inches and about 0.015 inches.

Yet another embodiment comprises a method for delivering a fastener that includes providing a cylindrical sleeve member having a first end and a second end, an inner wall and an outer wall extending between the first and second ends, and an elongated relief having a first end and a second end and extending between the outer wall and the inner wall, the relief extending at least partially between the first and second ends of the sleeve member and in communication with the second end of the sleeve member and configured to receive a plurality of fasteners therethrough, the inner wall defining an interior space, the inner wall having an inner diameter, providing a ram member having a first end with a circular cross-section and a second end, wherein the ram member is slidably movable within the interior space between a first position where the first end of the ram member is proximate the first end of the relief and the ram member is removed from covering the relief, and a second position where the first end of the ram member is proximate the second end of the relief and the ram member covers at least a majority of the relief, the first end ram member having an outer diameter. The method may also include providing a feed assembly operably coupled to the sleeve member and in communication with the relief of the sleeve member and configured to provide the plurality of fasteners to the interior space in a non-oriented manner, providing a drive assembly operably coupled to the second end of the ram member and configured to actuate the ram member between the first and second positions, moving the ram member to the first position via the drive assembly, feeding a plurality of fasteners through the relief and into the interior space of the sleeve member via the feed assembly, and moving the ram member from the first position to the second position thereby forcing the plurality of fasteners from the interior space and through the second end of the sleeve member.

The principal objects of the embodiments as disclosed herein are to provide a durable, uncomplicated design that is efficient in use and capable of a long operating life, while reducing or eliminating problems associated with delivering fasteners, e.g. washers, such as jamming of the fasteners within the delivery system due to the relatively thin configuration of the fasteners. The embodiments as disclosed herein are particularly well adapted for delivering such fasteners efficiently and economically by reducing malfunctions within an associated manufacturing cell caused by jamming or misfeeds of the fasteners.

These and other advantages will be further understood and appreciated by those skilled in the art by reference to the following written specification, claims and appended drawings.

DETAILED DESCRIPTION OF PREFERRED EMBODIMENT

Figure 1:
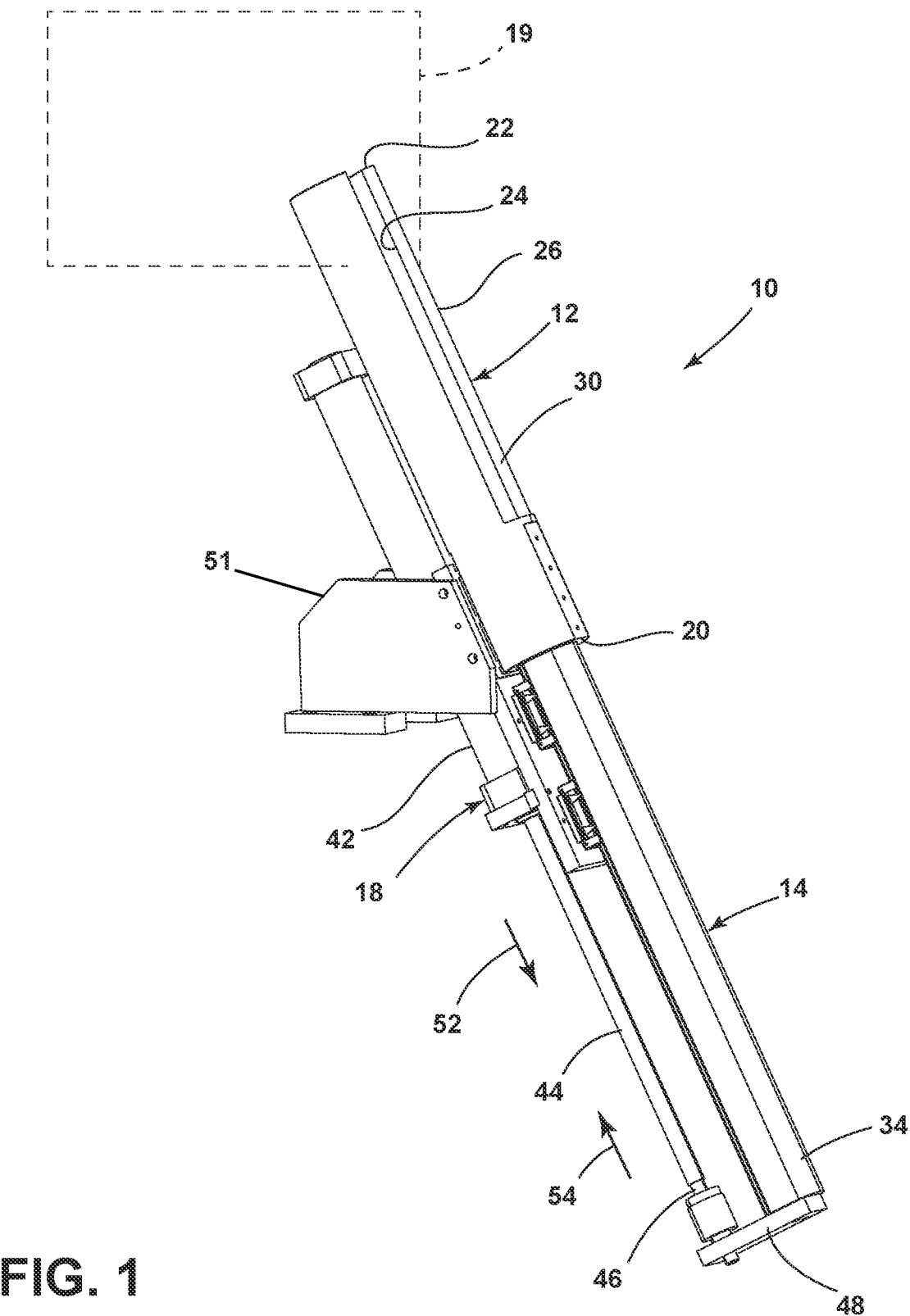
FIG. 1 is a perspective view of a fastener delivery arrangement.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

The reference numeral 10 (FIG. 1) generally designates a fastener delivery arrangement configured to deliver or feed mechanical fasteners between locations within a manufacturing cell. In the illustrated example, the fastener delivery arrangement 10 includes a cylindrical sleeve member 12, a ram member 14 reciprocatingly or slidably received within the sleeve member 12 and configured to move a plurality of mechanical fasteners through the cylindrical sleeve member 12, a feed assembly configured to provide the plurality of fasteners to the sleeve member 12, a cylinder assembly 18 configured to actuate the ram member 14, and a fastener receiver 19 configured to receive fasteners forced from or delivered through within the sleeve member 12.

In the illustrated example, the sleeve member 12 is provided with a cylindrical cross-section, and includes a first end 20, a second end 22, an inner wall 24 and an outer wall 26 that extend between the first and second ends 20, 22. The inner wall 24 defines an interior space 28 of the sleeve member 12 extending along the length thereof. The sleeve member 12 further includes an elongated relief 30 extending between the inner and outer walls 24, 26 and along a length of the sleeve member 12 between the first and second ends 20, 22 thereof. In the illustrated example, the relief 30 is in communication with or opens into the open second end 22 of the sleeve member 12 and remains open along the entire length of the relief 30. Preferably, the sleeve member 12 comprises steel, where the inner wall 24 of the sleeve member 12 may comprise a ferritic nitrocarburized surface, such as DynaBlu®, as available from Dynamic Surface Technologies Int. of Canton, Mich.

The ram member 14 includes a first end 32 received within the interior space 28 of the sleeve member 12, and a second end 34. In the illustrated example, the first end 32 of the ram member 14 is provided with a circular cross-section where the first end 32 of the ram member 14 is closely received within the inner wall 24 of the sleeve member 12 as described below. Preferably, the ram member 14 comprises aluminum, where at least the first end 24 of the ram member 14 comprises a hardcoat anodized surface, such as NiTuff®, as available from Pioneer Metal Finishing LLC of Green Bay, Wis.

The feed assembly 16 of the fastener delivery arrangement 10 may include a tray member 36 having a pair of arcuate side walls 38 and a bottom wall 40 that cooperate to define a bin for delivering parts to the interior space 28 of the sleeve member 12.

The cylinder assembly 18 may include a pneumatic drive cylinder arrangement that includes a tube 42 and a piston rod 44 where a distal end 46 of the piston rod 44 is coupled to the second end 34 of the ram member 14 via a bridge member 48. The cylinder assembly 18 is configured to move the ram member 14 within the sleeve member 12 between the first and second positions as described below. Although a pneumatic cylinder assembly is utilized in the illustrated example, other suitable drive arrangements may also be utilized, including hydraulic cylinders, electrically actuated cylinders, mechanical gear trains, chain drives, and the like.

The fastener receiver 19 may be provided in the form of a receiver bin that is configured to receive the fasteners as they are forced from the interior space 28 of the sleeve member 12 as described below.

In operation, an operator loads the bin 36 of the feed assembly 16 with a plurality of mechanical fasteners 49. In the illustrated example, the plurality of fasteners 49 includes lock washers of a relatively thin thickness, where the thickness of the washers may be less than or equal to 0.015 inches. While such fasteners 49 are susceptible to jamming within previously known feed arrangements, the present inventive fastener delivery arrangement 10 prevents jamming or clogging of the fasteners within the fastener delivery arrangement 10, thereby assuring optimal and continuous feeding of the fasteners 49 within the overall manufacturing cell.

Figure 2:
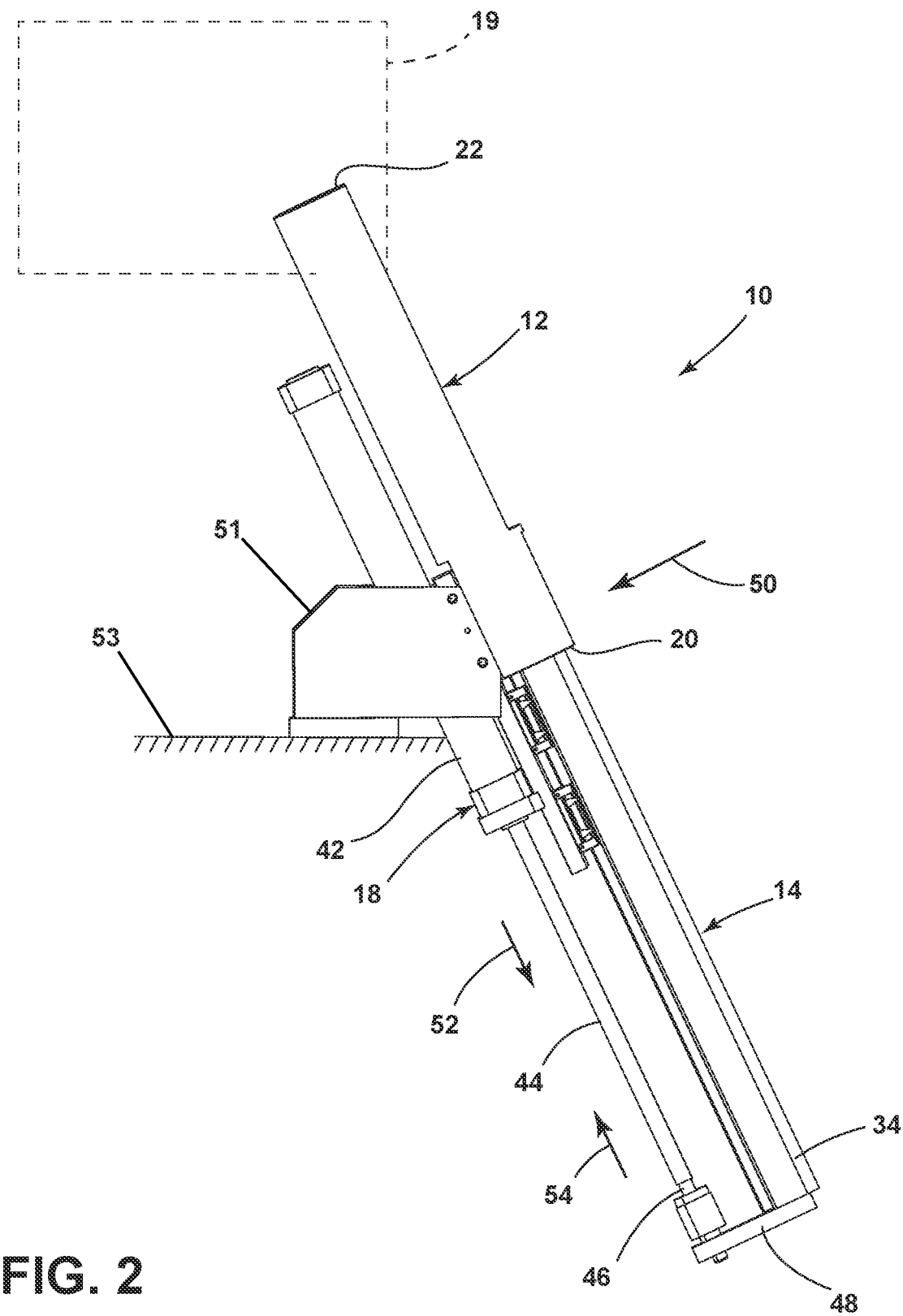
FIG. 2 is a side elevation view of the fastener delivery arrangement.
Figure 3:
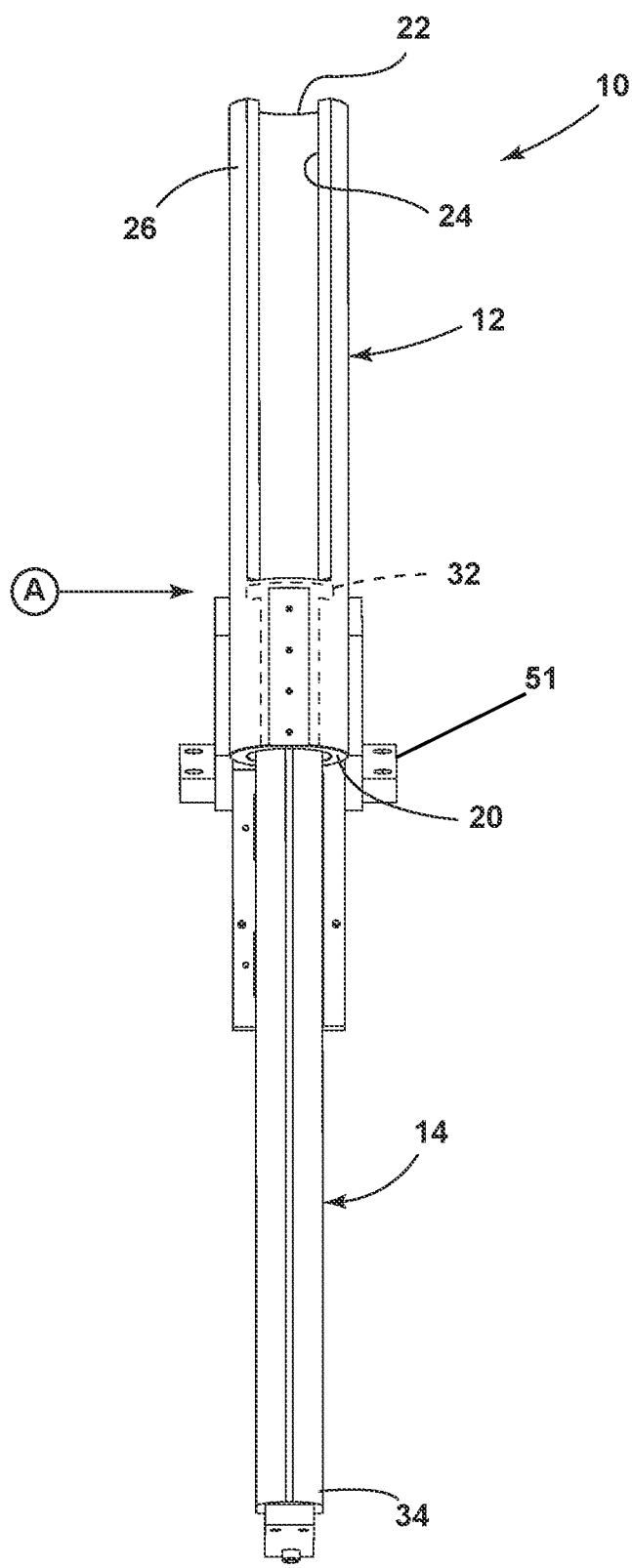
FIG. 3 is a front elevation view of the fastener delivery arrangement.
Figure 4:
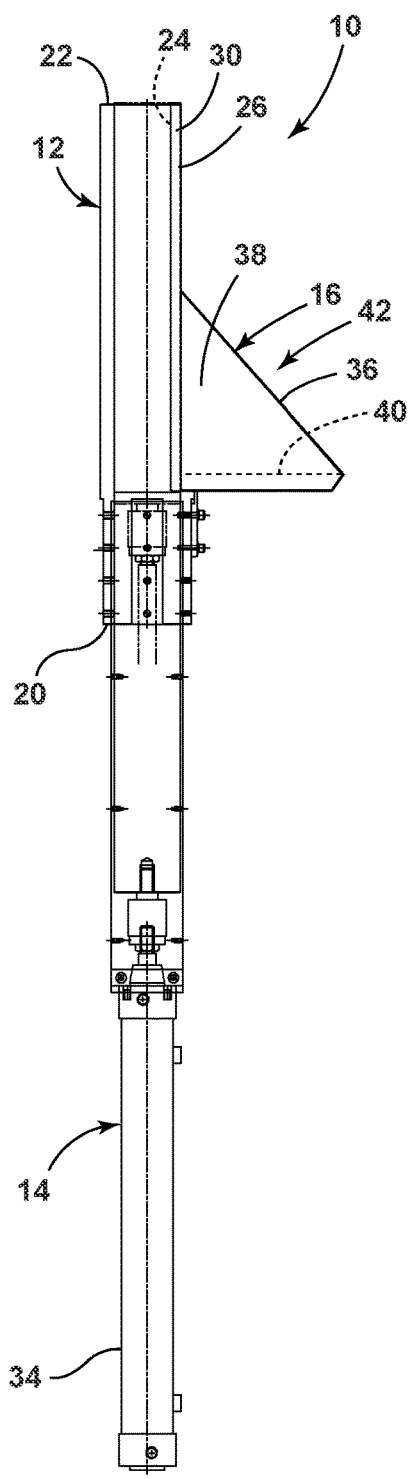
FIG. 4 is a side elevation view of the fastener delivery arrangement.
Figure 5:
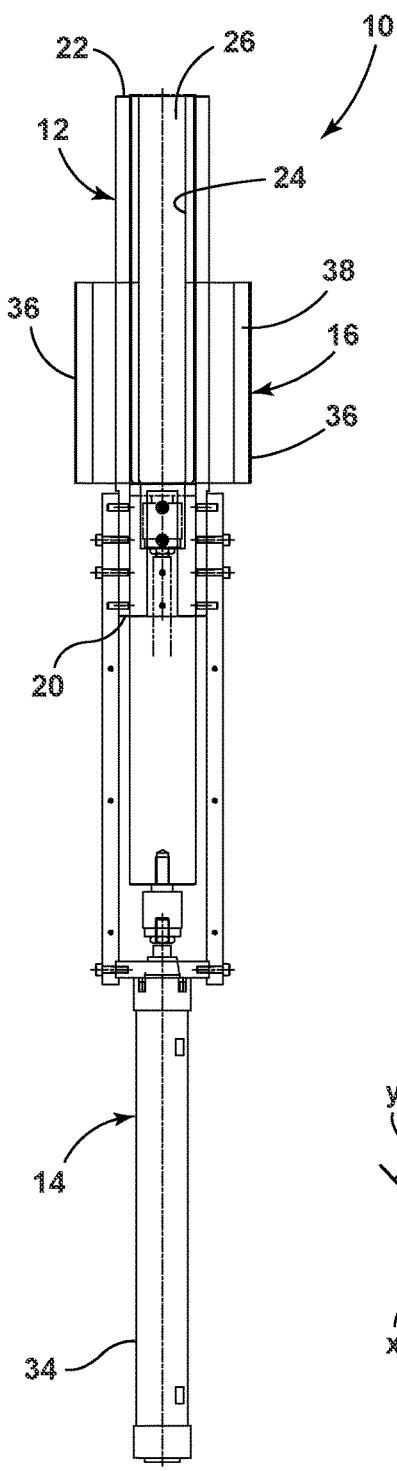
FIG. 5 is a front elevation view of the fastener delivery arrangement.
Figure 6:
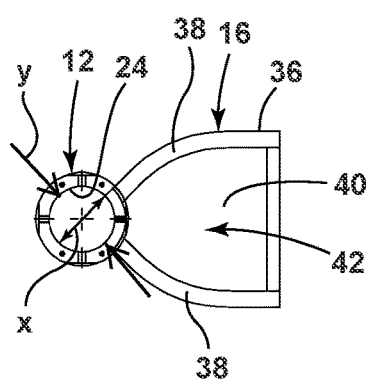
FIG. 6 is an end elevation view of the fastener delivery arrangement.
Figure 7A:
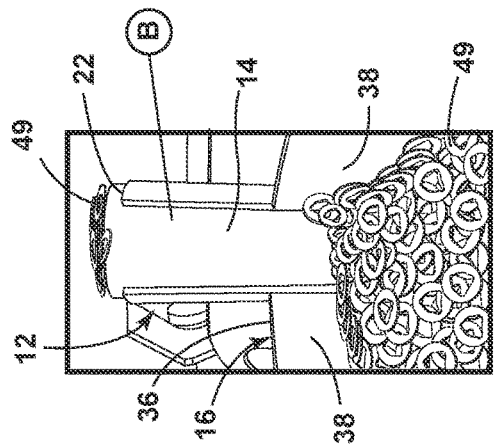
FIGS. 7A-7F are front perspective views of the fastener delivery arrangement operated between a first position and a second position.
Figure 7B:
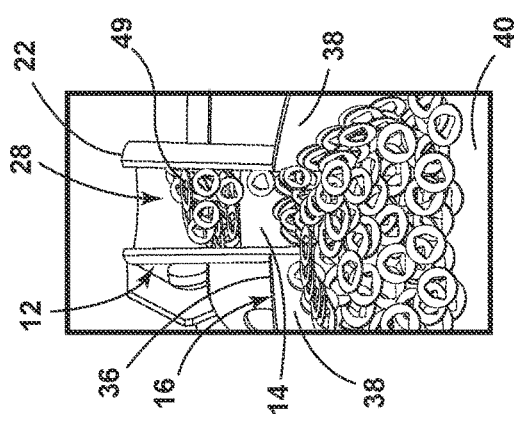
Figure 7C:
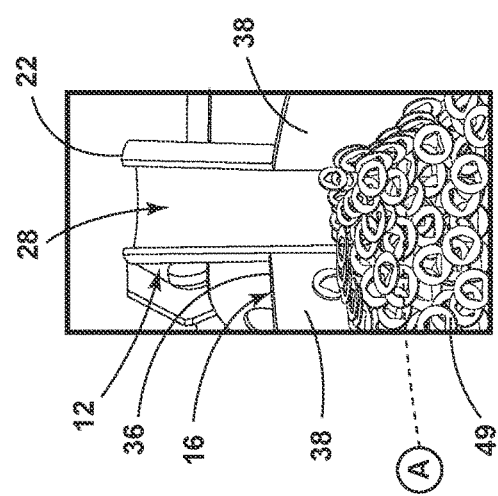
Figure 7D:
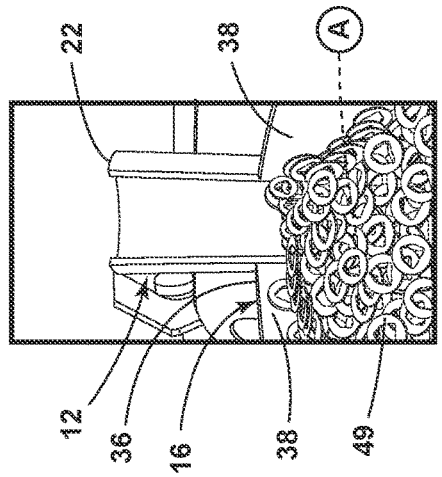
Figure 7E:
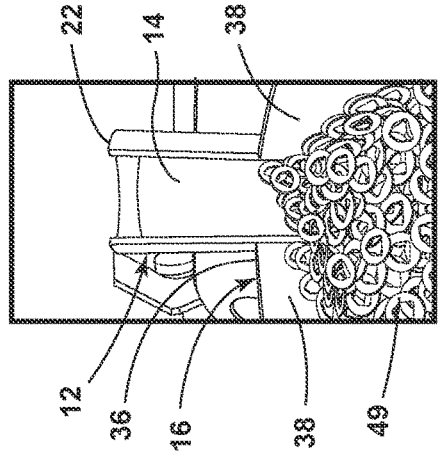
Figure 7F:
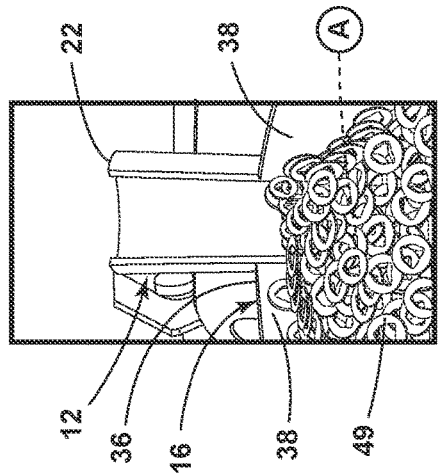

In operation, an operator supplies a plurality of fasteners 49 to the bin or tray member 36 of the feed assembly 16. In the illustrated example, the plurality of mechanical fasteners 49 includes a plurality of relatively thin lock washers that are provided in a non-oriented manner. The fastener delivery arrangement 10 may be oriented in a canted orientation such as that illustrated in FIGS. 1 and 2, such that gravity forces the fasteners 49 toward the rear of the tray member 36, and toward the sleeve member 12. In the illustrated example, the fastener delivery arrangement 10 includes a mounting assembly 51 that supports the fastener delivery arrangement 10 from a ground surface 53, where the ground surface 53 may include a component of the manufacturing cell, a separate mounting station, an elevated floor surface, and the like. As best illustrated in FIGS. 4-7A, the tray member 36 is attached to the sleeve member 12 such that the tray member 36 is aligned and in communication with the relief 30 of the sleeve member 12. The piston rod 44 of the cylinder assembly 18 is extended from the tube 42 in a direction 52, thereby moving the first end 32 of the ram member 14 to the first position A where the ram member 14 is withdrawn or removed from covering the relief 30, thereby allowing the fasteners 49 to enter the interior space 28 of the sleeve member 12 via the relief 30. The piston rod 44 of the cylinder assembly 18 is then moved in a direction 54 thereby forcing the first end 32 of the ram member 14 from the first position A (FIG. 7A) through an intermediate position (FIG. 7B) to the second position (FIG. 7C) where the first end 32 of the ram member 14 is even with or extends slightly from the second end 22 of the sleeve member 12, thereby forcing the fasteners 49 from the interior space 28 and through the second end 22 of the sleeve member 12 and into the receiving bin 19, and such that the ram member 14 covers the relief 30, thereby preventing additional fasteners 49 from entering the interior space 28 via the relief 30. Once all or a majority of the fasteners 49 have exited the interior space 28 of the sleeve member 12 and have been received within the receiving bin 19, the piston rod 44 of the cylinder assembly 18 is then moved in the direction 54 such that the second end 34 of the ram member 14 is moved from the second position B (FIG. 7D) through an intermediate position as illustrated in FIG. 7E, and back to the first position A (FIG. 7F) where the ram member 14 is withdrawn from covering the aperture or relief 30, such that another batch of the fasteners 49 are received into the interior space 28 of the sleeve member 12 via the relief 30.

In the illustrated example, the difference between the diameter X of the inner wall 24 of the sleeve member 12 and the diameter Y of the first end 32 of the ram member 14 in combination with the cylindrical/circular configuration of the inner wall 24 of the sleeve member 12 and the first end 34 of the ram member 14 act to prevent the fasteners 49, for example the lock washers shown in FIGS. 7A-7F, from entering the space between the first end 32 of the ram member 14 and the inner wall 24 of the sleeve member 12. Preferably, the difference between the diameter X of the inner wall 24 of the sleeve member 12 and the diameter Y of the first end 32 of the ram member 14 is between about 0.002 inches and about 0.015 inches, more preferably between about 0.002 inches and about 0.01 inches, and most preferably between about 0.002 inches and about 0.005 inches. As noted above, ferritic nitrocarburized surface treatment of the inner wall 24 of the sleeve member 12 and the hardcoat anodized surface of the first end 32 of the ram member 14 allow for maintaining a required tight tolerance between the ram member 14 and the sleeve member 12 to assure proper feeding of the fasteners by reducing or eliminating potential jamming of the fasteners within the associated elements of the fastener delivery arrangement 10.

The present inventive embodiment of the fastener delivery arrangement and related method as disclosed herein provide a durable, uncomplicated design that is efficient in use and capable of a long operating life, while reducing or eliminating problems associated with delivering fasteners, e.g. washers, such as jamming of the fasteners within the delivery system due to the relatively thin configuration of the fasteners. The embodiments as disclosed herein are particularly well adapted for delivering such fasteners efficiently and economically by reducing malfunctions within an associated manufacturing cell caused by jamming or misfeeds of the fasteners.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A fastener delivery arrangement, comprising:
a cylindrical sleeve member having a first end and an at least partially open second end, an inner wall and an outer wall extending between the first and second ends, and an elongated relief having a first end and a second end and extending between the outer wall and the inner wall, the relief extending at least partially between the first and second ends of the sleeve member and in communication with the second end of the sleeve member and configured to receive a plurality of fasteners therethrough, the inner wall defining an interior space;
a ram member having a first end with a circular cross-section and a second end, wherein the ram member is slidably movable within the interior space between a first position where the first end of the ram member is proximate the first end of the relief and the ram member is removed from covering the relief, and a second position where the first end of the ram member is proximate the second end of the relief thereby forcing the plurality of fasteners from the interior space through the second end of the sleeve member and the ram member covers at least a majority of the relief;
a feed assembly in operable communication with the relief of the sleeve member and configured to provide the plurality of fasteners to the interior space in a non-oriented manner;
a drive assembly operably coupled to the second end of the ram member and configured to actuate the ram member between the first and second positions; and
a fastener receiver configured to receive the plurality of fasteners forced from the interior space of the sleeve member as the ram member moves from the first position to the second position.

2. The fastener delivery arrangement of claim 1, wherein the sleeve member comprises steel.

3. The fastener delivery arrangement of claim 1, wherein the inner wall of the tube member comprises a ferritic nitrocarburized surface.

4. The fastener delivery arrangement of claim 1, wherein the ram member comprises aluminum.

5. The fastener delivery arrangement of claim 1, wherein the first end of the ram member comprises a hardcoat anodized surface.

6. The fastener deliver arrangement of claim 1, wherein the feed assembly includes a parts hopper having a bottom wall extending outwardly from the sleeve member and a pair of sidewalls extending outwardly from the sleeve member and upwardly from the bottom wall.

7. The fastener delivery arrangement of claim 1, wherein a difference between an inner diameter of the inner wall of the sleeve member and an outer diameter of the first end of the ram member is between about 0.002 inches and about 0.015 inches.

8. The fastener delivery arrangement of claim 7, wherein the difference between the inner diameter of the inner wall of the sleeve member and the outer diameter of the first end of the ram member is between about 0.002 inches and about 0.005 inches.

9. The fastener delivery arrangement of claim 1, wherein the second end of the sleeve member is completely open.

10. The fastener delivery arrangement of claim 1, wherein the drive assembly comprises a cylinder assembly.

11. The fastener delivery arrangement of claim 10, wherein the cylinder assembly includes a pneumatic cylinder assembly.

12. The fastener delivery arrangement of claim 10, wherein a longitudinal axis of the cylinder assembly is axially offset from a longitudinal axis of the ram member.

13. A method for delivering a fastener, comprising:
   moving the ram member to the first position via the drive assembly;
   feeding a plurality of fasteners through the relief and into the interior space of the sleeve member via the feed assembly; and
   moving the ram member from the first position to the second position thereby forcing the plurality of fasteners from the interior space and through the second end of the sleeve member and into the fastener receiver.

14. The method of claim 13, wherein the inner wall has a frist diameter and the first end of the ram ember has a second diameter, and wherein a difference between the first diameter of the inner wall of the sleeve member and the second diameter of the first end of the ram member is between about 0.002 inches and about 0.015 inches.

15. The method of claim 13, wherein the feed assembly includes a parts hopper having a bottom wall extending outwardly from the sleeve member and a pair of sidewalls extending outwardly from the sleeve member and upwardly from the bottom wall.

16. The method of claim 13, wherein the drive assembly comprises a cylinder assembly.

17. A fastener delivery arrangement, comprising:
   a cylindrical sleeve member having a first end and an at least partially open second end, an inner wall and an outer wall extending between the first and second ends, and an elongated relief having a first end and a second end and extending between the outer wall and the inner wall, the relief extending at least partially between the first and second ends of the sleeve member and in communication with the second end of the sleeve member and configured to receive a plurality of fasteners therethrough, the inner wall defining an interior space, the inner wall having an inner diameter;
   a ram member having a first end with a circular cross-section and a second end, wherein the ram member is slidably movable within the interior space between a first position where the first end of the ram member is proximate the first end of the relief and the ram member is removed from covering the relief, and a second position where the first end of the ram member is proximate the second end of the relief thereby forcing the plurality of fasteners from the interior space and through the second end of the sleeve member and the ram member covers at least a majority of the relief, the first end ram member having an outer diameter; and
   a feed assembly configured to provide the plurality of fastners to the cylindrical sleeve member;
   a drive assembly operably coupled to the second end of the ram member and configured to actuate the ram member between the first and second positions;
   wherein a difference between the inner diameter of the inner wall of the sleeve member and the outer diameter of the first end of the ram member is between about 0.002 inches and about 0.015 inches.

18. The fastener delivery arrangement of claim 17, wherein the feed assembly is operably coupled to the sleeve member and in communication with the relief of the sleeve member and is configured to provide the plurality of fasteners to the interior space in a non-oriented manner.

19. The fastener delivery arrangement of claim 17, further comprising:
   a parts receiver configured to receive the plurality of fasteners forced from the interior space of the sleeve member as the ram member moves from the first position to the second position.

20. The fastener delivery arrangement of claim 17, wherein the inner wall of the tube member comprises a ferritic nitrocarburized surface.

21. The fastener delivery arrangement of claim 17, wherein the ram member comprises aluminum.

22. The fastener delivery arrangement of claim 17, wherein the first end of the ram member comprises a hardcoat anodized surface.

23. The fastener deliver arrangement of claim 17, wherein the feed assembly includes a parts hopper having a bottom wall extending outwardly from the sleeve member and a pair of sidewalls extending outwardly from the sleeve member and upwardly from the bottom wall.

24. The fastener delivery arrangement of claim 17, wherein the difference between the inner diameter of the inner wall of the sleeve member and the outer diameter of the first end of the ram member is between about 0.002 inches and about 0.01 inches.

25. The fastener delivery arrangement of claim 17, wherein the drive assembly comprises a cylinder assembly.

26. The fastener delivery arrangement of claim 25, wherein the cylinder assembly includes a pneumatic cylinder assembly.

27. The fastener delivery arrangement of claim 25, wherein a longitudinal axis of the cylinder assembly is longitudinally offset from a longitudinal axis of the ram member.

* * * * *